(12) United States Patent
White et al.

(10) Patent No.: US 11,344,956 B2
(45) Date of Patent: May 31, 2022

(54) WOOD CORING DRILL BIT

(71) Applicants: Vincent Graham White, Mission (CA); Kirk Thomas Lanz, Mission (CA)

(72) Inventors: Vincent Graham White, Mission (CA); Kirk Thomas Lanz, Mission (CA)

(73) Assignee: K.V. ENTERPRISES LTD.

( * ) Notice: Subject to any disclaimer, the term of this patent is extended or adjusted under 35 U.S.C. 154(b) by 0 days.

(21) Appl. No.: 16/231,488

(22) Filed: Dec. 22, 2018

(65) Prior Publication Data

US 2019/0193172 A1 Jun. 27, 2019

Related U.S. Application Data

(60) Provisional application No. 62/708,782, filed on Dec. 22, 2017.

(51) Int. Cl.
*B23B 51/04* (2006.01)
*B27B 5/12* (2006.01)

(52) U.S. Cl.
CPC .......... *B23B 51/0426* (2013.01); *B23B 51/04* (2013.01); *B27B 5/12* (2013.01)

(58) Field of Classification Search
CPC . B23B 51/0433; B23B 51/0406; B23B 51/04; B23B 51/0411; B23B 51/0467; B23B 51/0426; B27B 5/12; Y10T 408/895; Y10T 408/8953
See application file for complete search history.

(56) References Cited

U.S. PATENT DOCUMENTS

| | | | | |
|---|---|---|---|---|
| 2,312,176 A | * | 2/1943 | Kotowski | E21B 10/02 408/204 |
| 2,319,528 A | * | 5/1943 | Barbour | E21B 10/04 408/205 |
| 4,693,644 A | * | 9/1987 | Takahashi | B23B 51/0406 408/204 |
| 6,588,992 B2 | * | 7/2003 | Rudolph | B23B 51/04 408/204 |
| 6,786,684 B1 | * | 9/2004 | Ecker | B23B 51/0406 408/204 |
| 7,674,078 B1 | | 3/2010 | Buzdum et al. | |
| 8,052,356 B2 | | 11/2011 | Singh | |

(Continued)

FOREIGN PATENT DOCUMENTS

| | | | | |
|---|---|---|---|---|
| DE | 102014117170 A1 | * | 5/2016 | B27B 5/12 |
| JP | 09192912 A | * | 7/1997 | |
| NL | 9400753 A | * | 12/1995 | B23B 51/0406 |

*Primary Examiner* — Eric A. Gates
*Assistant Examiner* — Paul M Janeski
(74) *Attorney, Agent, or Firm* — FisherBroyles, LLP; Susan M. Oiler

(57) ABSTRACT

Wood core drilling bits for use in wood frame construction of structures in the residential and/or commercial market and sets of the same have a cylindrical barrel defining an axis of rotation and a first end that is open and a second end defined by a hub having a bore therethrough. The open end defines a plurality of cutting teeth and the cylindrical barrel defines a plurality of slots radially therethrough. The plurality of slots are positioned as points of a three-dimensional curve turning about the axis of rotation while moving parallel to the axis of rotation.

16 Claims, 3 Drawing Sheets

(56) References Cited

U.S. PATENT DOCUMENTS

| | | | |
|---|---|---|---|
| 8,444,353 B2* | 5/2013 | Khangar | B23B 51/0433 |
| | | | 408/204 |
| 8,579,554 B2 | 11/2013 | Novak et al. | |
| 2006/0263156 A1* | 11/2006 | Cossette | B23B 51/0406 |
| | | | 408/204 |
| 2007/0140802 A1* | 6/2007 | Locke | B23B 27/16 |
| | | | 408/204 |
| 2010/0047030 A1 | 2/2010 | Eiserer et al. | |
| 2010/0067995 A1 | 3/2010 | Keightley | |
| 2014/0023446 A1* | 1/2014 | Piller | B23B 51/0406 |
| | | | 408/204 |
| 2015/0190866 A1* | 7/2015 | Yu | B23B 51/0426 |
| | | | 408/204 |
| 2017/0157681 A1* | 6/2017 | Parendo | B23B 51/0406 |

\* cited by examiner

WOOD CORING DRILL BIT

RELATED APPLICATIONS

This application claims the benefit of U.S. Provisional Application No. 62/708,782, filed Dec. 22, 2017, which is incorporated herein by reference in its entirety.

TECHNICAL FIELD

The invention relates to a wood coring drill bit, more particularly, a wood coring drill bit having a plurality of slots radially therethrough positioned as points of a three-dimensional curve turning about the axis of rotation while moving parallel to the axis of rotation.

BACKGROUND

In the construction industry, power tools of various design have been used to excavate wood in walls, wall plates, floor assemblies and floor joists to facilitate the installation of mechanical systems, such as plumbing, electrical conduits, heating, venting, and air conditioning (HVAC) systems, sprinklers, chilled water systems, hot water heating systems, etc. One problem that occurs, misalignment of piping shafts through several levels of a building, is often a result of a tradesman evacuating/cutting wood from several floor assemblies at a time (stacking floor assemblies together before installation and making the holes for the piping shafts). After installation, pipe shafts that are misaligned require new holes, which results in multiple cuts in one or more of the several levels, thereby decreasing the structural integrity of the structure. Another problem is the use of power tools, such as chainsaws, sawsals, reciprocating saws, and similar power tool, which can be detrimental to the structural integrity of a building due to misuse and the inaccuracy of the tool. Such tools have been banned by Architects and Structural Engineers in many locations because of building codes, in particular in locations with more rigorous seismic codes and/or fire rating codes related to penetrations of wood assemblies.

The wood coring bit of a hole saw disclosed herein solves the above problems as well as providing code compliant holes, especially in view of new code requirements related to fire ratings and subsequent mechanical systems vertical and horizontal multi-level penetrations, e.g., a gap of half inch around the circumference of the penetrations through wood assemblies to facilitate the installation of firestop assemblies.

SUMMARY

In all aspects, a wood coring drill bits are described that have a cylindrical barrel defining an axis of rotation. The cylindrical barrel has a first end that is open and defines a plurality of cutting teeth and a second end defined by a hub having a bore therethrough comprising a connecting feature to connect to a drill motor for rotation therewith. The cylindrical barrel defines a plurality of slots radially therethrough positioned as points of a three-dimensional curve turning about the axis of rotation while moving parallel to the axis of rotation. In all embodiments, the three-dimensional curve may be a helix and the plurality of slots may be oval-shaped slots.

In all aspects, a plane coinciding with a first longitudinal axis of a first slot is also coincident with a longitudinal axis of a fourth slot. The plane coinciding with the first longitudinal axis of the first slot may also be coincident with a longitudinal axis of a seventh slot. From an end view, each of the plurality of slots is positioned at a center-to-center distance of 60° from an immediate neighboring slot relative to a longitudinal axis passing through each slot. In one embodiment, the plurality of slots is eight slots.

In all aspects, the plurality of cutting teeth is defined by two pairs of diametrically opposed gullets. From an end view, the two pairs of diametrically opposed gullets are positioned 90° apart, center-to-center, from one another about the axis of rotation. The plurality of slots has a first slot most proximate the first end of the cylindrical barrel and centrally positioned between immediately neighboring gullets from the two pairs of diametrically opposed gullets. Further, each of the plurality of slots is offset from a central longitudinal axis of each of the gullets, which are U-shaped.

The length of the cylindrical barrel is at least twelve inches (30.5 cm).

In another aspect, a set of wood coring drill bits comprises a plurality of the wood coring drill bits described herein, but with different diameters and/or lengths.

DETAILED DESCRIPTION

Figure 1:
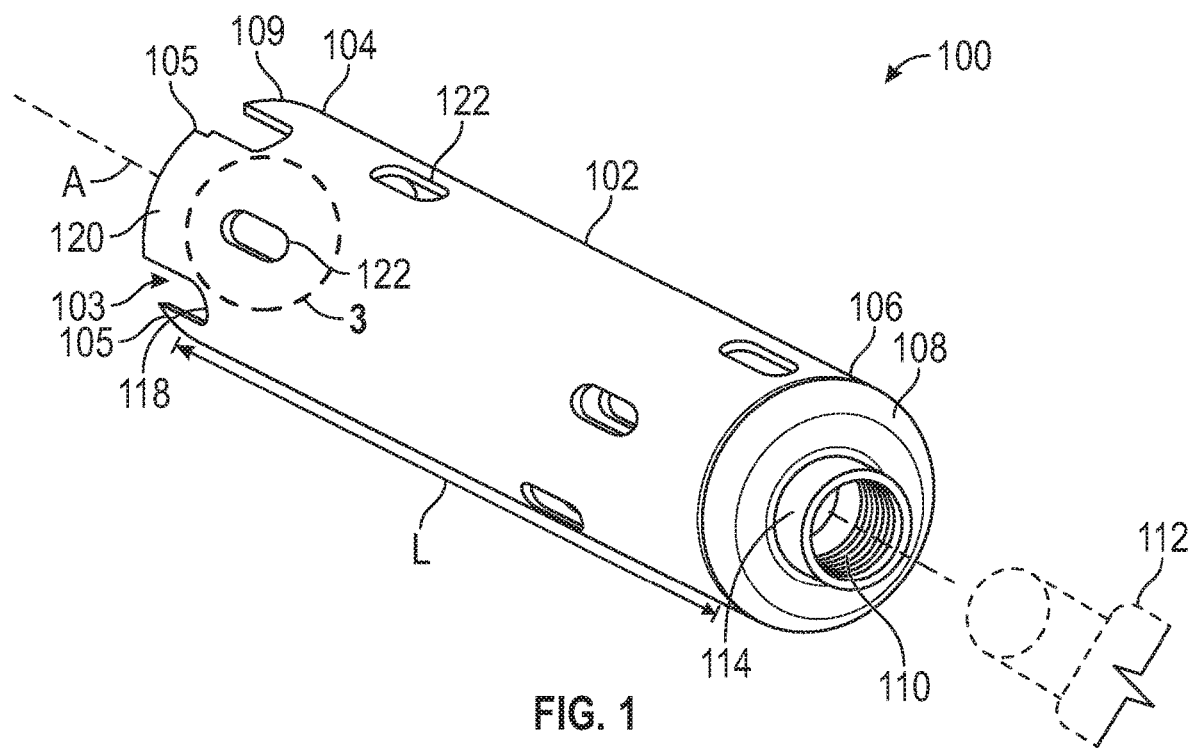
FIG. 1 is a perspective view of a wood coring bit from a hub end.

The following detailed description will illustrate the general principles of the invention, examples of which are additionally illustrated in the accompanying drawings. In the drawings, like reference numbers indicate identical or functionally similar elements.

Referring to FIG. 1, a wood coring drill bit 100 is illustrated, which has a cylindrical barrel 102 defining an axis of rotation A and a hollow cavity 103 and having a first end 104 that is open and a second end 106 defined by a hub 108 having a bore 110 therethrough configured to be coupled to a drill motor 112 for rotation therewith. The drill motor 112 may be any common coring tool or power/rotational tool with a force sufficient to drive the wood coring bit through a preselected wood or wood assembly. The first end 104 defines a plurality of cutting teeth 105.

Figure 2:
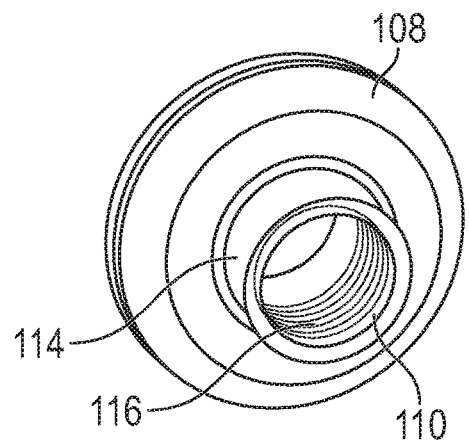
FIG. 2 is an end, perspective view of the hub of the wood coring bit of FIG. 1.

Referring to FIGS. 1 and 2, the hub 108 has an annular wall 114 protruding axially away from the cylindrical barrel 102, which defines a portion of the bore 110. In all aspects, the bore 110 comprises threading 116 or another type of connecting feature for connection to the drill motor and/or a drill bit 112 that can be centrally positioned within the cylindrical barrel 102. The connecting feature may be a key and keyway connection, with either the key or the keyway being present in the bore 110. The connecting feature may be a mating shaft end for a locking mechanism requiring a key or chuck to tighten the locking mechanism.

The hub 108 may be integral with the cylindrical barrel 102 or is fixedly attached thereto for rotation therewith. In one embodiment, the hub 108 is soldered to the cylindrical barrel 102, for example by a solder comprising silver, which adds strength to the bond. In one embodiment, the hub 108 is machined from solid billet and is fixedly attached to the cylindrical barrel 102. The cylindrical barrel 102 is a seamless annular sleeve of material, which may be a medium-carbon steel having about 0.3 to 0.8% carbon content and the cutting teeth are high-carbon steel having a carbon content of about 0.8% to about 25 carbon content, which provides less fracturing of the cutting edge steel as the wood bit penetrates nails embedded in a wood assembly and less binding during the coring process.

Figure 4:
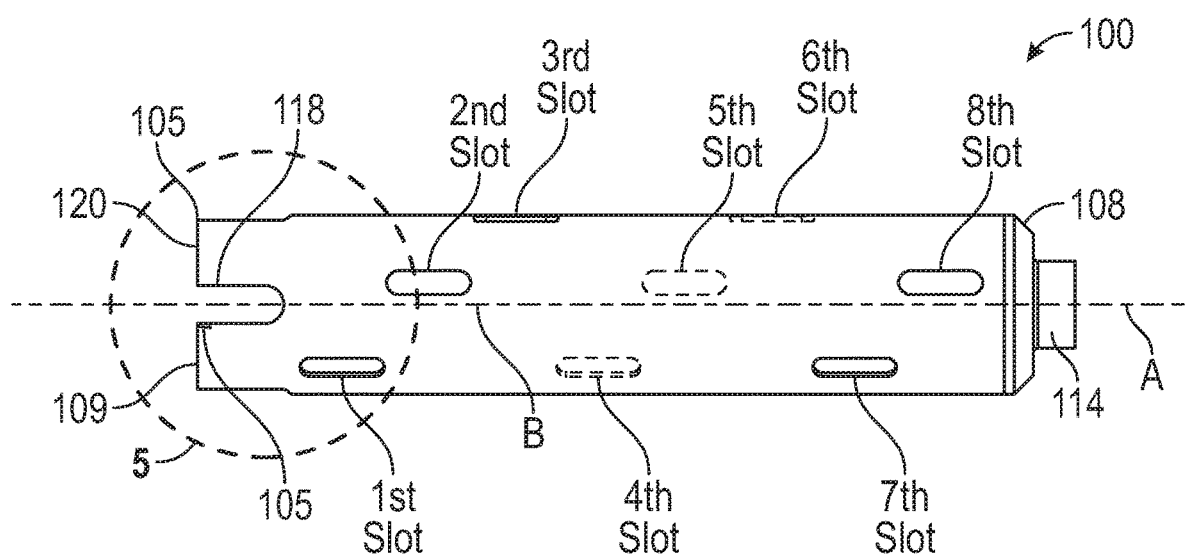
FIG. 4 is a side, plan view of the wood coring bit of FIG. 1 with a plurality of the spirally positioned slots visible in the first and second revolutions.
Figure 5:
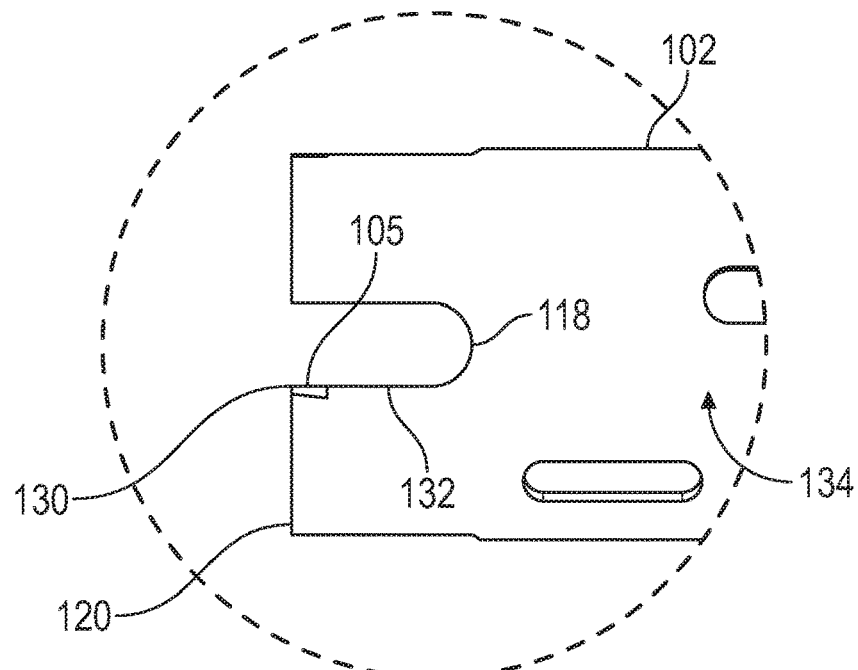
FIG. 5 is an enlarged, plan view of one of the gullets and a first cutting tooth of the wood coring bit of FIG. 1.
Figure 6:
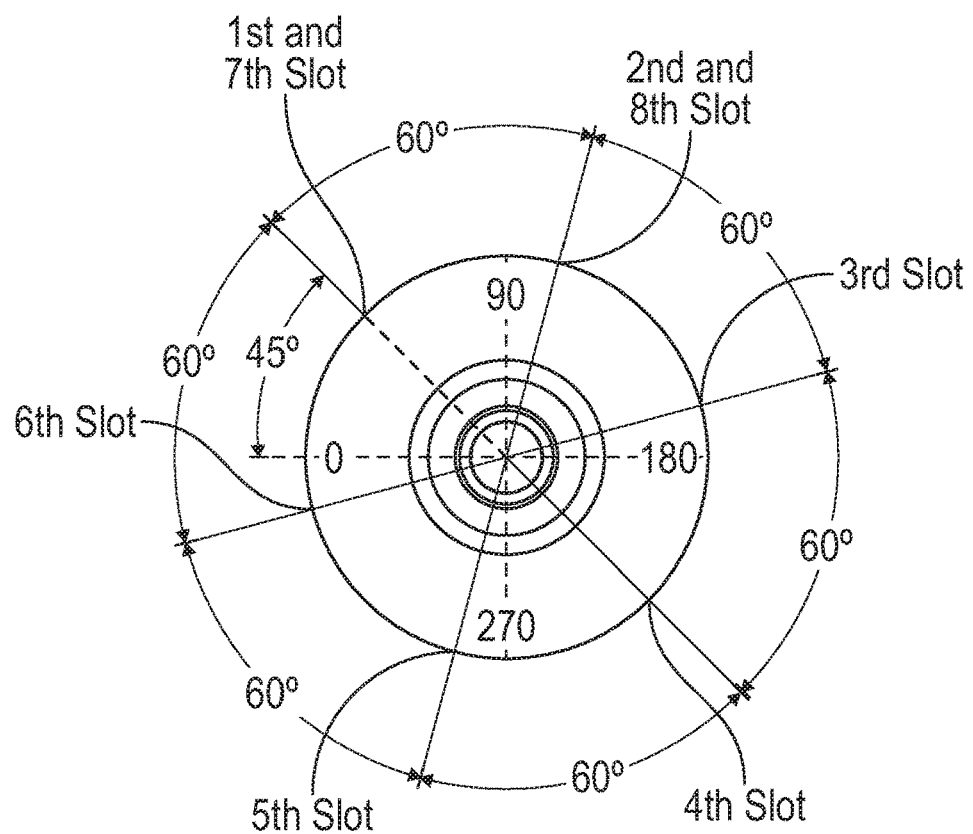
FIG. 6 is an end view of the wood coring bit of FIG. 1 defining the orientation of the gullets and the slots in the embodiment of FIG. 1.

Turning to FIGS. 4-6, the plurality of cutting teeth 105 are defined by two pairs of diametrically opposed gullets 118 cut into the rim 109 of the open end of the cylindrical barrel 102. As such, there are four tabs 120 each having one cutting tooth 105, but the wood coring bit is not limited thereto. Each gullet 118 is U-shaped and is oriented axially with each having a central longitudinal axis parallel to the axis of rotation as illustrated by axis A and axis B in FIG. 4. As best seen from the schematic end view in FIG. 6, the two pairs of diametrically opposed gullets are positioned 90° apart, center-to-center, from one another. The gullets have a depth of at least 1.5 inches and a width of at least ¾ an inch. In one embodiment, the gullets have a depth within a range of about 1.5 inches to about 3 inches and a width within a range of about 0.5 inches to 1.25 inches.

Figure 3:
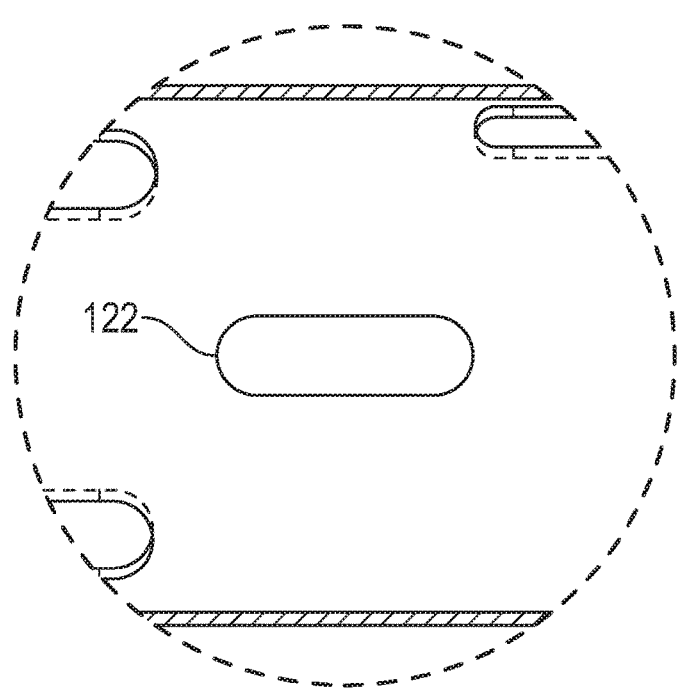
FIG. 3 is an enlarged, plan view of a first slot in the wood coring bit of FIG. 1.

Referring to FIGS. 3 and 5, one non-limiting example embodiment of the wood coring bit 100 is shown in enlarged detail including dimensions for a slot 122 and a gullet 118, respectively. The dimensions are in inches other than the radii. The dimensions may be smaller or larger as appropriate for variations in the diameter and/or the length of the cylindrical barrel 102.

As best shown in FIG. 5, each cutting tooth 105 is formed in a leading edge 130 of one of the tabs 120 defining one of the upright walls 132 of a U-shaped gullet 118. The cutting teeth 105 are angled 5°+/− manufacturing tolerances as shown in FIG. 5 about the axis of rotation from the exterior surface 134 of the cylindrical barrel 102 toward the gullet 118 and inward toward the hollow cavity 103 of the cylindrical barrel. In other words, the cutting teeth are radially oriented, not axially oriented, i.e., not in axial edge of the rim 109. Utilizing a 5° angle provides less metal fatigue and/or stress cracks, which extends the duty cycle or life of the bit.

Turning to FIGS. 4 and 6, the cylindrical barrel 102, in addition to defining the plurality of teeth 105, defines a plurality of slots 122 radially therethrough. The plurality of slots 122 are positioned as points of a three-dimensional curve turning about the axis of rotation while moving parallel to the axis of rotation from the first end 104 toward the second end 106. In all embodiments, the plurality of slots 122 may be oval-shaped slots or round-ended rectangular slots oriented with a longitudinal axis thereof coincident with the length L of the cylindrical barrel 102. The three-dimensional curve is a spiral or is a helix. In the helix, the three-dimensional curve turns around the axis of rotation A at a constant distance while moving parallel to the axis of rotation A. Within the spiral or helix, the first slot has a longitudinal axis and a plane coincident therewith that is also coincident with a longitudinal axis of a fourth slot, but on opposing surfaces of the cylindrical barrel, i.e., one on the front and the other on the back depending upon which slot is facing the user. Further, the plane coincident with the first longitudinal axis of the first slot is also coincident with a longitudinal axis of a seventh slot. The first slot and the seventh slot are on the same face of the cylindrical barrel, having completed one complete revolution of the spiral or helix.

From an end view as shown in FIG. 6, each of the plurality of slots 122 is positioned at a center-to-center distance of 60° from an immediate neighboring slot relative to a longitudinal axis passing through each slot. In the embodiment illustrated in the drawings, eight slots define the plurality of slots 122, but the drill bit is not limited thereto. There may be fewer or more slots depending upon the length of the cylindrical barrel. The plurality of slots 122 begin with a first slot most proximate the first end 104 of the cylindrical barrel 102 and centrally positioned between any two gullets 118, one each from the two pairs of diametrically opposed gullets, thereby making the gullets immediately neighboring gullets. The gullets 118 are at the 0°, 90°, 180°, and 270° positions in FIG. 6. As such, each of the plurality of slots is offset from a central longitudinal axis of each of the gullets. In one embodiment, the plurality of slots is in a spiral or in a helix that completes one revolution or more than one revolution about the cylindrical barrel.

In another aspect, a set of wood coring drill bits having a plurality of wood coring bits as described above, but of different diameters and/or different lengths. The diameters of the bits included in the kit may be any combination of any number of the following: ¾", ⅞", 1", and all diameter sizes from 1 inch to 5 inches in ⅛ increments. The length L of the bits in the kit, see FIG. 1 (length being measured from the rim 109 of the open end 104 to the beginning of the hub 108 at the second end 106 of the cylindrical barrel 102), may be any combination of any number of lengths from six inches to 30 inches, more preferably 12 inches to 24 inches in half inch or 1 inch increments. The diameters and lengths may be within manufacturing tolerances of +/−0.3 inches.

Although the invention is shown and described with respect to certain embodiments, it is obvious that modifications will occur to those skilled in the art upon reading and understanding the specification, and the present invention includes all such modifications.

What is claimed is:

1. A wood coring drill bit comprising:
   a cylindrical barrel defining a hollow cavity and an axis of rotation and having a first end that is open and defines a plurality of cutting teeth and a second end defined by a hub having a bore therethrough comprising a connecting feature to connect to a drill motor for rotation therewith;
   wherein the cylindrical barrel defines a plurality of slots radially therethrough, the plurality of slots being positioned as points of a three-dimensional curve turning about the axis of rotation while moving parallel to the axis of rotation;
   wherein the three-dimensional curve is a single spiral or single helix, and each of the plurality of slots are oriented with a longitudinal axis thereof coincident with the length of the cylindrical barrel and parallel to the axis of rotation;
   wherein a plane coinciding with a first longitudinal axis of a first slot is coincident with a longitudinal axis of a fourth slot and with a longitudinal axis of a seventh slot.

2. The wood coring drill bit of claim 1, wherein the plurality of slots are oval-shaped slots.

3. The wood coring drill bit of claim 1, wherein, from an end view, each of the plurality of slots is positioned at a center-to-center distance of 60° from an immediate neighboring slot relative to a longitudinal axis passing through each slot, thereby the slots coincident with the first slot are only those in accordance with n+3, wherein n is the number position of a slot in the three-dimensional curve.

4. The wood coring drill bit of claim 3, wherein there are eight slots defining the plurality of slots.

5. The wood coring drill bit of claim 1, wherein each of the plurality of cutting teeth is at a five degree angle relative to the axis of rotation.

6. The wood coring drill bit of claim 1, wherein each of the plurality of cutting teeth is defined in an upright wall of a gullet and is angled about the axis of rotation from an exterior surface of the cylindrical barrel toward the gullet and inward toward the hollow cavity of the cylindrical barrel.

7. The wood coring drill bit of claim 6, wherein each of the gullets is U-shaped.

8. The wood coring drill bit of claim 1, wherein the length of the cylindrical barrel is at least twelve inches.

9. The wood coring drill bit of claim 1, wherein the cylindrical barrel comprises carbide soft steel.

10. The wood coring drill bit of claim 9, wherein the cylindrical barrel is soldered to the hub by a silver solder.

11. A set of wood coring drill bits according to claim 1, wherein each wood coring drill bit in the set has a different diameter and/or different length.

12. The set of wood coring drill bits of claim 11, wherein the lengths vary within a range of 6 inches to 30 inches.

13. The set of wood coring drill bits of claim 12, wherein the lengths vary within a range of 12 inches to 24 inches.

14. A wood coring drill bit comprising:
a cylindrical barrel defining a hollow cavity and an axis of rotation and having a first end that is open and defines a plurality of cutting teeth and a second end defined by a hub having a bore therethrough comprising a connecting feature to connect to a drill motor for rotation therewith;
wherein the cylindrical barrel defines a plurality of slots radially therethrough, the plurality of slots being positioned as points of a three-dimensional curve turning about the axis of rotation while moving parallel to the axis of rotation;
wherein a plane coinciding with a first longitudinal axis of a first slot is coincident with a longitudinal axis of a fourth slot and with a longitudinal axis of a seventh slot and is oriented in the same direction as the axis of rotation;
wherein each of the plurality of cutting teeth is defined in an upright wall of a gullet and is angled about the axis of rotation from an exterior surface of the cylindrical barrel toward the gullet and inward toward the hollow cavity of the cylindrical barrel;
wherein there are two pairs of diametrically opposed gullets, and the first slot is positioned most proximate the first end of the cylindrical barrel centrally between one set of immediately neighboring gullets from the two pairs of diametrically opposed gullets.

15. The wood coring drill bit of claim 14, wherein each of the plurality of slots is offset from a central longitudinal axis of each of the gullets.

16. The wood coring drill bit of claim 14, wherein the three-dimensional curve is a single spiral or single helix.

* * * * *